(12) United States Patent
Jayanthi et al.

(10) Patent No.: US 8,646,089 B2
(45) Date of Patent: Feb. 4, 2014

(54) SYSTEM AND METHOD FOR TRANSITIONING TO A WHITELIST MODE DURING A MALWARE ATTACK IN A NETWORK ENVIRONMENT

(75) Inventors: Sridhar Jayanthi, Bangalore (IN); Praneet Khare, Gurgaon (IN); Gangadharasa Srinivasa, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 99 days.

(21) Appl. No.: 13/276,086

(22) Filed: Oct. 18, 2011

(65) Prior Publication Data

US 2013/0097708 A1   Apr. 18, 2013

(51) Int. Cl.
*G06F 11/00* (2006.01)

(52) U.S. Cl.
USPC ............................................... 726/25; 726/19

(58) Field of Classification Search
USPC ...................... 726/25, 19; 713/200
See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |
| 7,617,533 | B1 * | 11/2009 | Hernacki ........................ 726/22 |
| 7,640,589 | B1 | 12/2009 | Mashevsky et al. |
| 7,925,874 | B1 * | 4/2011 | Zaitsev ............................. 713/1 |
| 8,201,253 | B1 * | 6/2012 | Yan et al. ......................... 726/24 |
| 2003/0023866 | A1 * | 1/2003 | Hinchliffe et al. ............. 713/200 |
| 2006/0212940 | A1 * | 9/2006 | Wilson ............................ 726/22 |
| 2007/0028304 | A1 | 2/2007 | Brennan |
| 2008/0168558 | A1 * | 7/2008 | Kratzer et al. .................. 726/23 |
| 2009/0165132 | A1 * | 6/2009 | Jain et al. ........................ 726/22 |
| 2010/0162400 | A1 | 6/2010 | Feeney et al. |
| 2011/0041179 | A1 | 2/2011 | Stahlberg |
| 2012/0017272 | A1 * | 1/2012 | Little et al. ..................... 726/19 |

OTHER PUBLICATIONS

McAfee Application Control, Data Sheet, copyright 2010, retrieved and printed from http://www.mcafee.com/us/resources/data-sheets/ds-application-control.pdf, 2 pages.

McAfee Application Control Evaluation Guide, for Use with ePO 4.0 and 4.5, copyright 2010, retrieved and printed from https://kc.mcafee.com/resources/sites/MCAFEE/content/live/PRODUCT_DOCUMENTATION/23000/PD23358/en_US/MFE_APP_CON_WIN_EVAL_5_1.pdf, 47 pages.

(Continued)

*Primary Examiner* — Brian Shaw
(74) *Attorney, Agent, or Firm* — Patent Capital Group

(57) ABSTRACT

A method is provided in one example embodiment that includes receiving a signal to enable a whitelist mode on a host in a network, terminating a process executing on the host if the process is not verified, and blocking execution of software objects on the host if the software objects are not represented on the whitelist. In more particular embodiments, the method also includes identifying the process on a process list that enumerates one or more processes executing on the host. Yet further embodiments include quarantining the host if a second process on the process list is a critical process and if the second process is not verified. More specific embodiments include identifying and restarting another process on the process list if process memory was modified.

15 Claims, 5 Drawing Sheets

(56) References Cited

OTHER PUBLICATIONS

McAfee ePolicy Orchestrator 4.5 Product Guide, copyright 2009, retrieved and printed from https://kc.mcafee.com/resources/sites/MCAFEE/content/live/PRODUCT_DOCUMENTATION/21000_/PD21812/en_US/epo_450_product_guide_en-us.pdf, 298 pages.

International Search Report and Written Opinion for International Application No. PCT/US2012/058130 mailed Jan. 14, 2013.

McAfee VirusScan Enterprise 8.7i Product Guide, copyright 2008, retrieved and printed from https://kc.mcafee.com/resources/sites/MCAFEE/content/live/PRODUCT_DOCUMENTATION/20000/PD20690/en_US/vse_870_product_guide_en-us.pdf, 64 pages, copyright 2008 McAfee, Inc.

* cited by examiner

SYSTEM AND METHOD FOR TRANSITIONING TO A WHITELIST MODE DURING A MALWARE ATTACK IN A NETWORK ENVIRONMENT

TECHNICAL FIELD

This specification relates in general to network security, and more particularly, to a system and method for transitioning to a whitelist mode during a malware attack in a network environment.

BACKGROUND

The field of network security has become increasingly important in today's society. The Internet has enabled interconnection of different computer networks all over the world. The ability to effectively protect and maintain stable computers and systems, however, presents a significant obstacle for component manufacturers, system designers, and network administrators. This obstacle is made even more complicated due to the continually evolving array of tactics exploited by malicious operators. Certain types of malicious software can infect a host computer and perform any number of malicious actions, such as sending out spam or malicious emails from the host computer, stealing sensitive information from a business or individual associated with the host computer, propagating to other host computers, and/or assisting with distributed denial of service attacks, for example. In addition, targeted attacks in enterprises and other entities are becoming increasingly common. In a targeted attack, rather than propagating to many other hosts computers, only a few targeted host computers in a particular network environment (e.g., a company, government agency, etc.) are attacked. The malware infecting the targeted host computers may then proceed to leak sensitive or confidential data in small, less obvious amounts, possibly over a longer period of time (e.g., leaking small amounts of data each day over several weeks) in order to thwart detection efforts.

When a malware attack is discovered in a network environment such as an enterprise or government agency, recovery and clean up efforts can require significant network downtime. Such downtime could potentially cause lost revenue, lost worker productivity, lost production, lost business opportunities, etc. Hence, significant challenges remain for developing innovative tools to combat tactics that allow malicious operators to exploit host computers in network environments.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment that includes receiving a signal to enable a whitelist mode on a host in a network. The method also includes terminating a process executing on the host if the process is not verified. The method further includes blocking execution of one or more software objects on the host if the one or more software objects are not represented on the whitelist. In more particular embodiments, the process is not a critical process. In further embodiments, the method also includes identifying the process on a process list that enumerates one or more processes executing on the host. In example embodiments, the process is not verified if a software object associated with the process is not represented on the whitelist. Yet further embodiments include quarantining the host if a second process on the process list is a critical process and if the second process is not verified. More specific embodiments include identifying another process on the process list and restarting the other process if process memory was modified.

Example Embodiments

Figure 1:
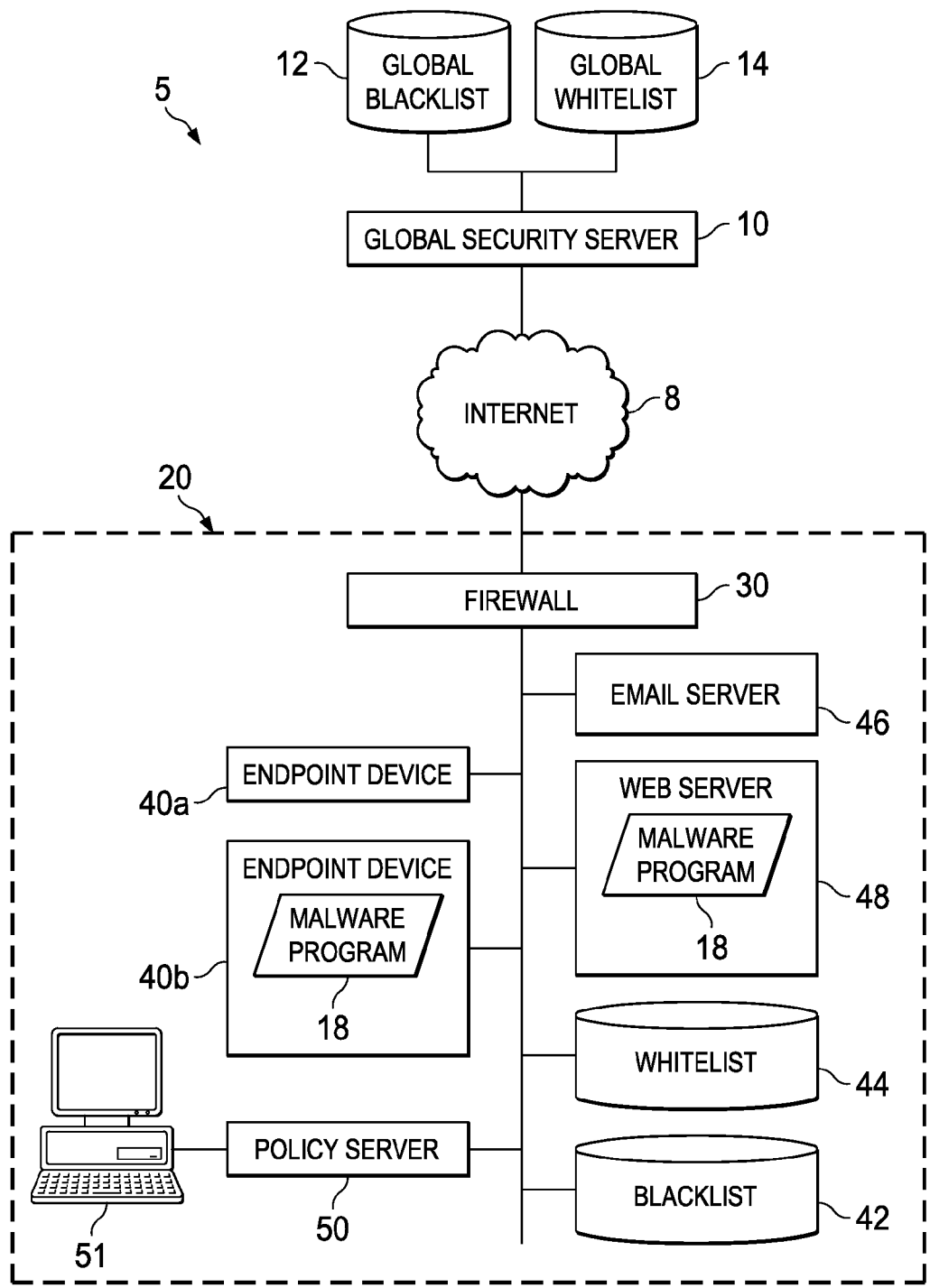
FIG. 1 is a simplified block diagram illustrating an example network environment in which a system for transitioning to a whitelist mode during a malware attack is implemented in accordance with this disclosure.

Turning to FIG. 1, FIG. 1 is a simplified block diagram of an example embodiment of a network environment 5 in which a system for transitioning to a whitelist mode during a malware attack is implemented in accordance with this specification. In the embodiment illustrated in FIG. 1, network environment 5 can include Internet 8, a global security server 10, a global whitelist 14, a global blacklist 12, and a network 20. In one example, network 20 could be associated with a particular entity (e.g., an enterprise, school, government agency, etc.) and could include nodes such as a firewall 30, a policy server 50 with a management console 51, endpoint devices 40a and 40b, an email server 46, and a web server 48. In this example embodiment, endpoint devices 40a and 40b, email server 46, and web server 48 are representative of hosts managed by policy server 50, which may be configured for administering and distributing network policies to the hosts. In addition, data repositories may also be provided in network 20, containing a whitelist 44 and a blacklist 42 for enabling security components to protect network 20 against malware attacks. For illustrative purposes, a malware program 18 is also shown in endpoint device 40b and web server 48 to reflect an example scenario in which network 20 is a victim of a targeted malware attack.

Generally, endpoint devices 40a and 40b represent any termination point of a network connection that is operable to send and/or receive information in a network environment. Endpoint devices 40a-b can include, but are not limited to wired or wireless devices such as desktops, workstations, laptops or electronic notebooks, personal digital assistants (PDAs), or mobile communication devices (iPhone, Android, iPad, etc.), embedded devices (e.g., printers, ATMs, etc.), or any other device, component, element, or object capable of initiating voice, audio, or data exchanges and serving as a termination point within a network environment. Endpoint devices 40a-b may also be inclusive of a suitable interface to a human user.

Policy server 50, email server 46, web server 48, firewall 30, and global security server 10 are examples of network elements that may be provisioned in a network environment having a system for transitioning to a white list mode. Network elements are intended to encompass network appliances, servers, routers, switches, gateways, bridges, loadbalancers, firewalls, processors, modules, or any other similar device, component, element, or object operable to exchange information in a network environment. Network elements and endpoint devices may also include any suitable hardware, software, components, modules, interfaces, or objects that facilitate the operations thereof. This may be inclusive of appropriate algorithms and communication protocols that allow for the effective exchange of data or information.

Each of the elements of FIG. 1 may couple to one another through simple interfaces or through any other suitable connection (wired or wireless), which provides a viable pathway for network communications. Additionally, any one or more of these elements may be combined or removed from the architecture based on particular configuration needs. Network environment 5 may include a configuration capable of transmission control protocol/Internet protocol (TCP/IP) communications for the transmission or reception of packets in a network. Network environment 5 may also operate in conjunction with a user datagram protocol/IP (UDP/IP) or any other suitable protocol where appropriate and based on particular needs.

The system for transitioning to a whitelist mode during a malware attack in a network environment, such as the one outlined in FIG. 1, can virtually eliminate downtime for a network having a confirmed or suspected malware infection. Embodiments of the system can enable a network (e.g., network 20) to transition from a normal mode to a whitelist mode while experiencing negligible downtime. When a network is clean (i.e., without malware), it can operate in a normal mode. In example embodiments, a normal mode can be equivalent to an antivirus mode, in which a network operates with an antivirus engine configured to protect against malware. The antivirus engine can be configured in each host computer (or host) of the network and may use blacklisting techniques to evaluate a software object prior to execution on the host to determine whether the software object is 'blacklisted' (e.g., when the software object is represented on a blacklist by its signature or checksum that corresponds to a signature or checksum of known malware on the blacklist). Any blacklisted software objects can be blocked from executing, while other software objects can be allowed to execute.

If a network is under attack (e.g., infected with malware that has not been blocked) or if a network is suspected of being under attack, then embodiments of the system can transition the network, or a designated segment thereof, from the normal mode (e.g., running an antivirus engine) to a whitelist mode, which can be more restrictive and protected than an antivirus mode. In example embodiments of a whitelist mode, a whitelist engine can be configured in each host computer of the network and can use whitelisting techniques to evaluate a software object prior to execution on the host to determine whether the software object is 'whitelisted' (e.g., when the software object is represented on a whitelist by its signature or checksum that corresponds to a signature or checksum of a known, trusted object on the whitelist). Whitelisted software objects can be permitted to execute, while other software objects can be blocked. In addition, at the time of transition, a process list of each host may be evaluated to determine whether any of the processes are corrupted. Processes that are not verified (e.g., by referencing a whitelist) may be terminated. In addition, hosts running corrupted critical processes may be quarantined. Furthermore, processes associated with process memory modifications may be restarted with the whitelist mode enabled. Once all processes have been evaluated and either terminated, restarted, or allowed to continue execution, with one or more hosts possibly being quarantined, the network (or designated segment thereof) can continue to operate in the more restrictive whitelist mode, with virtually no downtime experienced by end users.

For purposes of illustrating the techniques of a system and method for transitioning to a whitelist mode during a malware attack in a network environment, it is important to understand certain activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments used in organizations and by individuals include the ability to communicate electronically with other networks. For example, the Internet may be used to access web pages hosted on remote servers, to send or receive electronic mail (i.e., email) messages, or to exchange files. Malicious operators are continuously developing new tactics that use the Internet to spread malware in network environments. Malware can be used, for example, to disrupt normal network and individual computer usage and to gain access to confidential information available through an infected network or host computer.

'Malware' is commonly used as a label for any hostile, intrusive, or annoying software such as a computer virus, spyware, adware, etc., but generally includes any software designed to interfere with the normal operation of a computer or network through unauthorized access, destruction, disclosure, or modification of data, and/or through denial of service. Some malware may be designed to give a remote operator control over it, in which the remote operator can use the malware to control host computers for malicious activity, such as a performing a denial-of-service attack, spamming, or stealing confidential information. Malware may also include one or more propagation vectors that enable it to spread within an entity's network or across other networks of entities or individuals. Common propagation vectors include exploiting known vulnerabilities on hosts within a local network and sending malicious emails having a malicious program attached or providing malicious links within the emails.

More recently, malware operators have been increasingly relying on targeted attacks to steal sensitive or confidential information in a network. Typically in a targeted attack, malware infects only a few targeted hosts in a network associated with a particular entity (e.g., a company, government agency, etc.). The malware infecting the targeted hosts may leak sensitive data in small quantities over a long period of time (e.g., leaking small amounts of data each day over several weeks), because leaking small amounts of data can be more difficult to detect in a network than transmitting excessive or even normal quantities of data. Thus, network administrators (i.e., authorized users tasked with the security of a network) may have more difficulty detecting the infection. Consequently, a targeted attack could persist for an extended period of time before recovery and corrective efforts begin.

At some point, most businesses, financial institutions, and other entities are likely to experience general malware infections and/or targeted attacks. In particular, well-known and large businesses, financial institutions, and government agencies are likely to be targeted. During a malware attack on a large organization (i.e., when malware has infected one or more hosts in the organization's network), the network could potentially have hundreds, thousands, or even more computers down at a time including, for example, production systems, servers, endpoint devices, accounting systems, financial systems, e-commerce systems, government security systems, etc. Generally, when a network is under attack, an entire network, or segments thereof, may be brought down and disconnected from the Internet in order to prevent further damage by and propagation of the malware, and to allow the infected hosts to be decontaminated (e.g., malware removed, file systems repaired, etc.). In many cases, an infected network can sustain significant downtime while recovering from an attack. Such downtime can potentially cause devastating consequences in terms of financial losses, worker productivity, goodwill with consumers, essential governmental functions, etc.

One example malware attack targeting large entities was named 'Operation Aurora.' Operation Aurora had a primary goal of gaining access to and potentially modifying source code repositories at high technology, security, and defense contractor companies. Other attacks have targeted government entities (e.g., International Monetary Fund (IMF), the U.S. Senate, the Pentagon, and the Central Intelligence Agency (CIA)). Similar attacks have occurred in foreign governments, banking industries, and Olympic organizations.

Because of the potential consequences of bringing down an organization's network, the ultimate decision to do so in response to a malware attack (or suspected malware attack) is often a human decision (e.g., by a network administrator together with organization leaders). Typically, however, a security solution is implemented in the network and provides the human decision-makers with detailed information related to the activities within the network. For example, ePolicy Orchestrator manufactured by McAfee, Inc., of Santa Clara, Calif., can be configured to manage hundreds or thousands of hosts within a network and to receive various event notifications (e.g., certain ports being used, data being transmitted during particular days/times, quantities of data being sent out of the network, etc.) from the hosts. The event notifications can be correlated, aggregated, or otherwise analyzed to generate various informational data including reports, graphs, alerts, emails, etc. regarding network activities. This informational data can be used to assist a network administrator in discovering a problem or atypical activity in the network. The discovery can lead to further investigation and possibly a determination that the network is under a malware attack. Even if a network administrator cannot confirm malware activity, a sufficient amount of suspicious network activity may lead the network administrator to determine that the network is more likely than not under a malware attack (i.e., a suspected malware attack).

Once the determination is made that a network is under attack or is suspected to be under an attack, a decision can be made as to whether to bring down the entire network or selected portions thereof. There is a need for companies and other organizations to have an option to go into a 'bunker mode' in which systems (or at least essential systems) of a network are kept up and running, without having to disconnect from the Internet and without having to shut down critical systems within the network.

A system for transitioning to a whitelist mode during a malware attack in a network environment can overcome these shortcomings (and others). In embodiments disclosed herein, the system facilitates a substantially seamless transition in a network, or a specified portion thereof, from a normal mode to a more restrictive whitelist mode in a predetermined clean (or uninfected) state. The transition can occur without shutting down the network or impacting crucial applications (e.g., critical business applications). Control can be provided via a policy setting to decide whether to transition immediately (as-is) or to provide users an opportunity (e.g., n minutes) to save important data files before processes, associated with software objects not originally represented in a whitelist, are terminated. In example embodiments, an attack signal may be communicated by a network administrator or other authorized user (referred to as a 'big red button') to initiate the transition. The attack signal can be any electronic communication configured to initiate a transition from the antivirus mode to the whitelist mode in hosts on the network. Once the network is clean (malware-free or uninfected), a normal mode of operation can be resumed (e.g., with a less restrictive, antivirus engine protecting hosts on the network).

Turning to the infrastructure of FIG. 1, FIG. 1 illustrates one possible embodiment of a network environment 5 in which the system for transitioning to a whitelist mode during a malware attack may be implemented. Network environment 5 may be configured as one or more networks in any suitable form including, but not limited to local area networks (LANs), wireless local area networks (WLANs), virtual local area networks (VLANs), metropolitan area networks (MANs), wide area networks (WANs) such as the Internet, virtual private networks (VPNs), Intranets, Extranets, any other appropriate architecture or system, or any suitable combination thereof that facilitates communications in a network environment. Network environment 5 may be configured using various suitable wired technologies (e.g., Ethernet) and/or wireless technologies (e.g., IEEE 802.11x).

In one embodiment, network 20 of network environment 5 may be operably coupled to Internet 8 by an Internet Service Provider (ISP) or through an Internet Server with dedicated bandwidth. Network 20 could also be connected to other logically distinct networks configured as LANs, for example, or any other suitable network configuration. The connection to Internet 8 and other logically distinct networks may include any appropriate medium such as, for example, digital subscriber lines (DSL), telephone lines, T1 lines, T3 lines, wireless, satellite, fiber optics, cable, Ethernet, etc. or any suitable combination thereof. Routers, switches, gateways, firewalls (e.g., 30), and any other suitable network elements may also be provisioned in network environment 5, inclusive of network 20, to facilitate electronic communication.

Network environment 5 of FIG. 1 also includes global security server 10 connected to Internet 8. While numerous servers may be connected to Internet 8, global security server 10 represents a service providing one or more storage repositories containing information related to software objects evaluated for risk. For example, software objects evaluated and determined to be untrustworthy (e.g., containing malicious code such as viruses, worms, etc.) may be represented in a so-called 'blacklist.' Software objects evaluated and determined to be trustworthy (e.g., uncontaminated, free of malicious code, etc.) may be represented in a so-called 'whitelist.' Although whitelists and blacklists may be implemented separately, it is also possible for them to be combined in a single storage repository, such as a database, with each software object being identified as either a whitelist file or a blacklist file.

In example embodiments, whitelists and blacklists can be implemented using signatures or checksums. In such embodiments, a unique checksum for each evaluated software object may be appropriately stored in a whitelist or blacklist and can be readily compared to a computed checksum of a software object sought to be evaluated. A checksum can be a mathematical value or hash sum (e.g., a fixed string of numerical digits) derived by applying an algorithm to a software object or a portion of a software object. If the algorithm is applied to a second software object that is identical to the first software object, then the checksums should match. However, if the second software object is different (e.g., it has been altered in some way, it is a different version of the first software object, it is a wholly different type of software, etc.) then the checksums are very unlikely to match.

Storage repositories such as global whitelist 14 in FIG. 1 may be provided by independent third parties and may be regularly updated to provide a comprehensive listing of trustworthy software objects available to consumers. Similarly, storage repositories such as global blacklist 12 may be provided by independent third parties and may be regularly updated to provide a comprehensive listing of untrusted, malicious software objects. Global whitelists and blacklists can be external to network 20 and can be accessible through other networks such as Internet 8, or through any other suitable connection that permits electronic communication with network 20.

Network 20 of FIG. 1 can also include local whitelist 44 and local blacklist 42. Local whitelist 44 can contain information related to software objects evaluated for risk and can represent software objects using checksums. Software objects represented in local whitelist 44 may be inclusive of software objects from one or more global whitelists; however, local whitelist 44 may be customized. In particular, software objects developed internally within the organization, but not necessarily available to the general public, may be represented in local whitelist 44. Additionally, local blacklist 42 could also be provided in network 20 to allow an antivirus engine to locally evaluate software objects attempting to execute on a host in network 20. Local whitelist 44 and blacklist 42 can be updated (e.g., dynamically, scheduled regularly, on demand) to reflect newly approved software objects and newly discovered threats, respectively. These updates can be coordinated via policy server 50 accessing one or more global or third party whitelists, in example embodiments.

Figure 2:
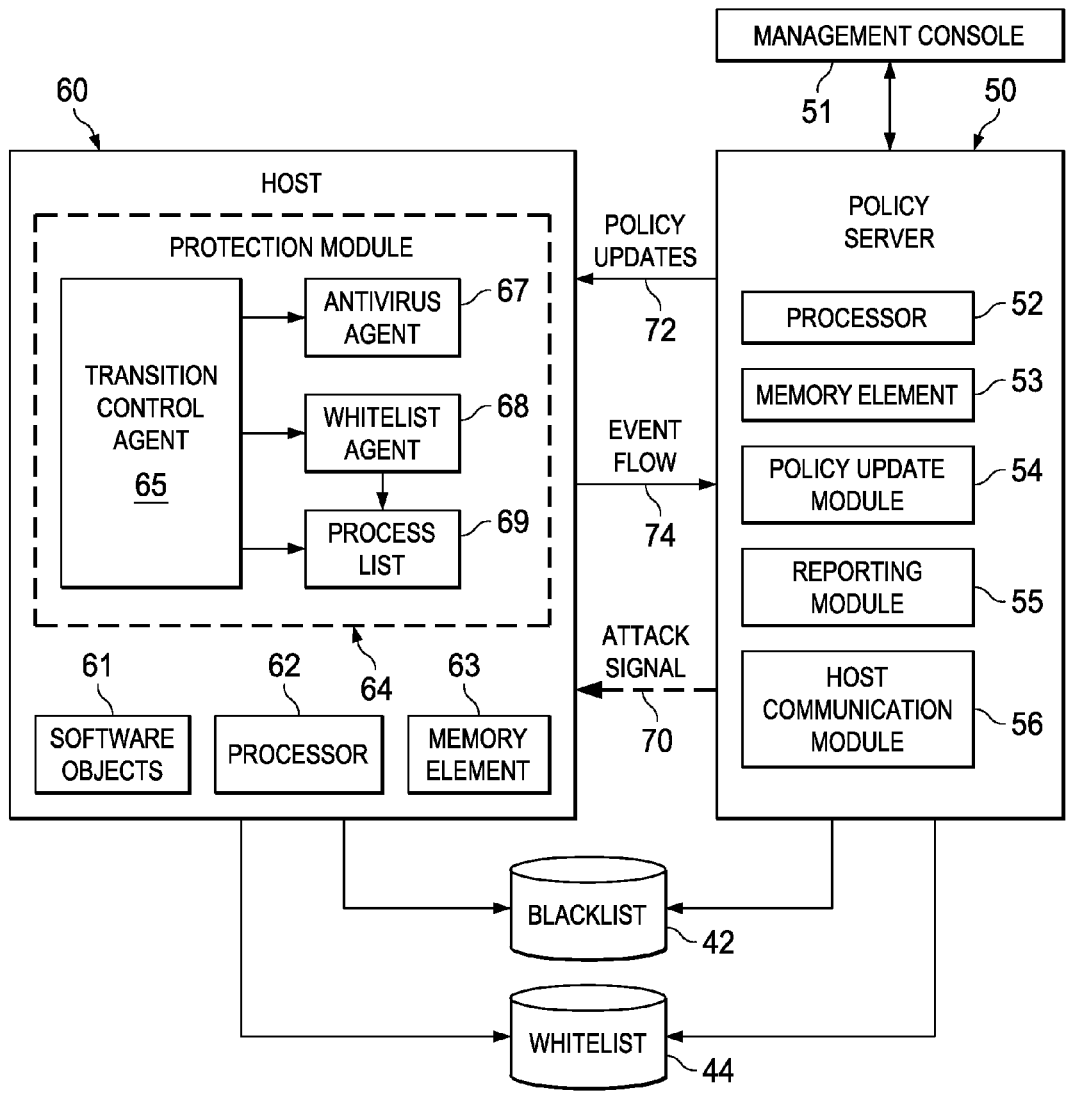
FIG. 2 is a simplified block diagram illustrating additional details that may be associated with components of the system in accordance with the disclosure.

Turning to FIG. 2, FIG. 2 is a simplified block diagram illustrating additional details associated with one potential embodiment of the system for transitioning to a whitelist mode during a malware attack. FIG. 2 includes policy server 50 with management console 51, whitelist 44, blacklist 42, and a host 60. Host 60 is representative of endpoint devices and network elements that may be managed by a policy server in a network. With reference to the example configuration in FIG. 1, host 60 represents endpoint devices 40a-b, email server 46, and web server 48, which may be managed by policy server 50 in network 20. The infrastructure of a network in which the system can be implemented can include any number of hosts 60 and, accordingly, network 20 of FIG. 1 is not intended to imply any architectural limitations.

Each of host 60 and policy server 50 can include a respective processor 62, 52 and a respective memory element 63, 53. More particularly, policy server 50 can include a policy update module 54, a reporting module 55, and a host communication module 56. Host 60 can include software objects 61 and protection module 64. In one example embodiment, protection module 64 could include antivirus agent 67, whitelist agent 68, and a transition control agent 65. In addition, a process list 69 may be generated, for example, by whitelist agent 68 when one or more software objects is executing on host 60. Components of protection module 64 in host 60 are illustrated as separate modules or agents for ease of explanation. Such agents may be distinct modules as illustrated, may be combined in a single module, or may be configured in any other suitable way. In some embodiments, transition control agent 65 could be configured to bridge an antivirus agent with a whitelist agent, and in certain embodiments, the antivirus agent and/or the whitelist agent could be commercially available.

In regards to an internal structure associated with host 60 and policy server 50, memory elements 63 and 53 can be configured to store information to be used in the operations outlined herein. Host 60 and/or policy server 50 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein (e.g., memory elements 53 and 63 and data repositories including whitelists 14, 44 and blacklists 12, 42) should be construed as being encompassed within the broad term 'memory element.' The information being used, tracked, sent, or received by host 60 and/or policy server 50 could be provided in any database, register, queue, table, cache, list, control list, or other storage structure, all of which can be referenced at any suitable timeframe. Any such storage options may be included within the broad term 'memory element' as used herein.

In certain example implementations, the functions outlined herein may be implemented by logic encoded in one or more tangible, non-transitory media (e.g., embedded logic provided in an ASIC, digital signal processor (DSP) instructions, software (potentially inclusive of object code and source code) to be executed by a processor, or other similar machine, etc.). In some of these instances, memory elements (as shown in FIG. 2) can store data used for the operations described herein. This includes the memory elements being able to store software, logic, code, or processor instructions that are executed to carry out the activities described herein.

In one example implementation, host 60 and/or policy server 50 may include software modules (e.g., protection module 64, policy update module 54, reporting module 55, host communication module 56) to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of host 60 and/or policy server 50 may include a processor (e.g., processors 62 and 52) that can execute software or an algorithm to perform activities as discussed herein. A processor can execute any type of instructions associated with the data to achieve the operations detailed herein. In one example, the processors (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Activities for transitioning to a whitelist mode may, in example embodiments, be provided at least in part by a protection module of each host in a network (e.g., protection module 64 of host 60) and by host communication module 56 and policy update module 54 of policy server 50. Information related to the activities can be suitably rendered, or sent to a specific location (e.g., host 60, policy server 50, etc.), or simply stored or archived (e.g., process list 69, whitelist 44, blacklist 42, etc.), and/or properly displayed in any appropriate format (e.g., through management console 51, etc.). Security technology related to one or more such activities for transitioning to a whitelist mode can include elements such as ePolicy Orchestrator (ePO) software, Application Control software, and/or VirusScan software (all manufactured by McAfee, Inc. of Santa Clara, Calif.), or other similar software. Thus, any such components, or suitable portions thereof, may be included within the broad scope of the terms 'antivirus agent,' 'whitelist agent,' 'transition control agent,' 'policy update module,' 'reporting module,' 'host communication module,' 'whitelist,' and 'blacklist' as used herein in this Specification. Whitelists 44 and 14, blacklists 42 and 12, and process list 69 may include information related to transitioning to a whitelist mode and these elements can readily cooperate, coordinate, or otherwise interact with the modules and components of host 60 and policy server 50.

As shown in FIG. 2, host 60 includes software objects 61, which can be part of a file system in host 60 and which are intended to encompass any object comprising instructions that can be understood and processed on a computer (e.g., host 60). Software objects 61 can include, but are not limited to, applications, executable files, software files, program files, library modules (e.g., dynamic link library (DLL) files), object files, binaries, other executable modules, script files, interpreter files, operating system files, etc. In certain malware attack scenarios, malware can be stored as a separate software object on a host or can modify an existing software object on a host to perform malicious or unauthorized functions.

Protection module 64 of host 60 may be configured in each host of a network (e.g., endpoint device 40a-b, email server 46, and web server 48) to provide antivirus protection ('antivirus mode') and whitelist protection ('whitelist mode') to the respective host. For example, protection module 64 can be deployed in both an endpoint device platform (e.g., Windows XP operating system (OS), Windows Vista OS, Windows 7 OS, etc.) and a server platform (e.g., Windows 2003 server, Windows 2008 server etc.).

Host 60 can be set up initially as clean or malwa re-free node to create a predetermined safe starting point. Antivirus agent 67 can be installed along with whitelist agent 68. Whitelist agent 68, however, can initially run in an observation mode, essentially relinquishing control to antivirus agent 67 and allowing host 60 to operate in an antivirus mode (e.g., using blacklisting techniques). In addition, processes executing on host 60 can be tracked to create and maintain process list 69. Process list 69 can include executing processes (some of which may be sub-processes) corresponding to software objects including, for example, loaded dynamic link libraries (DLLs) and loaded kernel drivers (e.g., for root-kit protection).

Generally, antivirus agent 67 and whitelist agent 68 can utilize one or more databases containing information related to software objects evaluated for risk, such as blacklist 42 and whitelist 44, respectively. During a normal mode (or antivirus mode) of operation (i.e., no malware attacks are occurring), antivirus agent 67 can use blacklisting to protect host 60 against malware. When protection module 64 receives an appropriate attack signal 70 (e.g., triggered by a network administrator), host 60 can be transitioned to operate in a whitelist mode by disabling the antivirus mode (e.g., by causing antivirus agent 67 to enter a dormant mode) and by enabling a whitelist mode in which whitelist agent 68 can work permissively (i.e., allowing a software object to execute if it is represented on a whitelist) and can have a memory protection component enabled.

In an example implementation, components of protection module 64 can be configured to traverse each process (according to process list 69) and evaluate each process (e.g., using a local whitelist 44 and/or global whitelist 14) to determine whether to allow or terminate the process. A process may be verified if a software object corresponding to the process is whitelisted (i.e., represented on a whitelist). If a process includes sub-processes, then each of the software objects corresponding to the sub-processes must also be whitelisted to verify the process. Conversely, a process may not be verified if a software object corresponding to the process is not whitelisted. If the process includes sub-processes, then the process may not be verified if any one of the software objects corresponding to the sub-processes is not whitelisted.

When the whitelist mode (or bunker mode) is enabled on a host, only whitelisted software objects may be permitted to execute on that host. If a critical process or service, which was executing prior to transitioning to the whitelist mode, is corrupted, however, whitelist agent 68 can enter into an isolation mode and disable network interfaces along with external storage ports. In this context, a 'critical process' or 'critical service' is a process or service that could potentially bring down the host and/or network if it is terminated or otherwise disabled. For example, a process invoked from an operating system file that was originally whitelisted could be a critical process because it could affect the operating system if the process is restarted or terminated. If the process is corrupted, or if a sub-process of the process is corrupted, then the process would not be verified (e.g., the corresponding corrupted operating system file would not be represented in a whitelist). In this scenario, instead of terminating the process, whitelist agent 68 could enter into the isolation mode.

Embodiments of the system can be configured to utilize one or more local whitelists such as whitelist 44, one or more global whitelists such as global whitelist 14, or any suitable combination thereof. In one embodiment, whitelist 44 could be configured as a master white list that is updated periodically or managed via central deployment controls. In another embodiment, whitelist 44 could be configured as a dynamically updated whitelist. In example implementations, updates to whitelist 44 could be managed by policy server 50 accessing one or more global whitelists such as global whitelist 14.

Depending on the configuration, components of protection module 64 could cycle through the process list, compare the appropriate whitelist against software objects corresponding to current processes in memory, and terminate all processes (and sub-processes) that are not represented in the whitelist and that are not critical processes. Thus, any non-corrupted important processes (e.g., crucial business applications, critical processes, etc.) can continue running with virtually no downtime after the attack signal is triggered. Additionally, any other processes that have not been corrupted could also continue running with no downtime.

In example embodiments, policy server 50 can be implemented to manage all or substantially all hosts (e.g., endpoint device 40a-b, email server 46, web server 48) within network 20 and to receive event notifications via event flow 74 from the hosts. Event notifications can include information concerning network activities and, particularly atypical activities (e.g., certain ports being used for network communications, data being transmitted during particular days/times, etc.). Reporting module 55 can provide informational data including reports, graphs, alerts, emails, etc. regarding network activities to a network administrator. In one example implementation, the correlated informational data can be provided to a network administrator via management console 51. This informational data can be used as a tool to assist the network administrator in discovering a problem or suspicious activity in the network.

If the network administrator determines that network 20 is under attack, then attack signal 70 may be triggered (e.g., via an option requiring authentication of the network administrator in a user interface screen displayed on management console 51). In addition, the network administrator may also be given the option to send attack signal 70 to a selected segment of network 20 (e.g., endpoint device 40b and web server 48). For example, if the network administrator is able to narrow down the attack to particular hosts or a particular segment of network 20, then the network administrator may opt to send attack signal only to the particular hosts identified or to hosts in the particular network segment identified. In example embodiments, attack signal 70 may be in the form of a whitelist policy to transition from the normal mode (e.g., antivirus mode) to the whitelist mode. The policy can be pushed to host 60 as indicated by policy updates 72.

Host communication module 56 can be configured to allow synchronous communication to antivirus agent 67 and whitelist agent 68 from policy server 50. Thus, policy server 50 can monitor the transition in host 60 from an antivirus mode to a whitelist mode and the evaluation and possible termination of currently executing processes on host 60 that are not verified.

Figure 3:
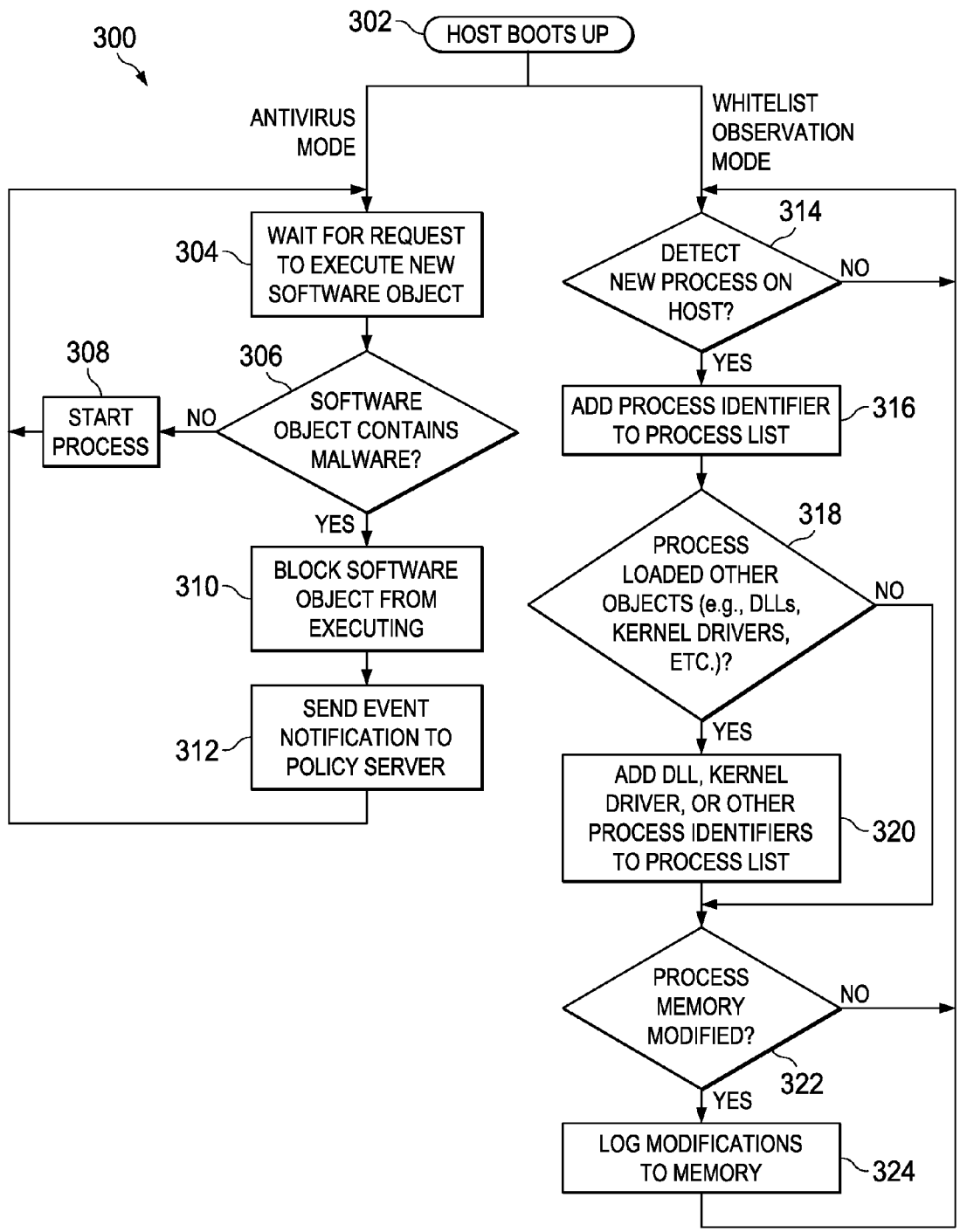
FIG. 3 is a simplified flow chart illustrating example operations that may be associated with the system in accordance with this disclosure.
Figure 4:
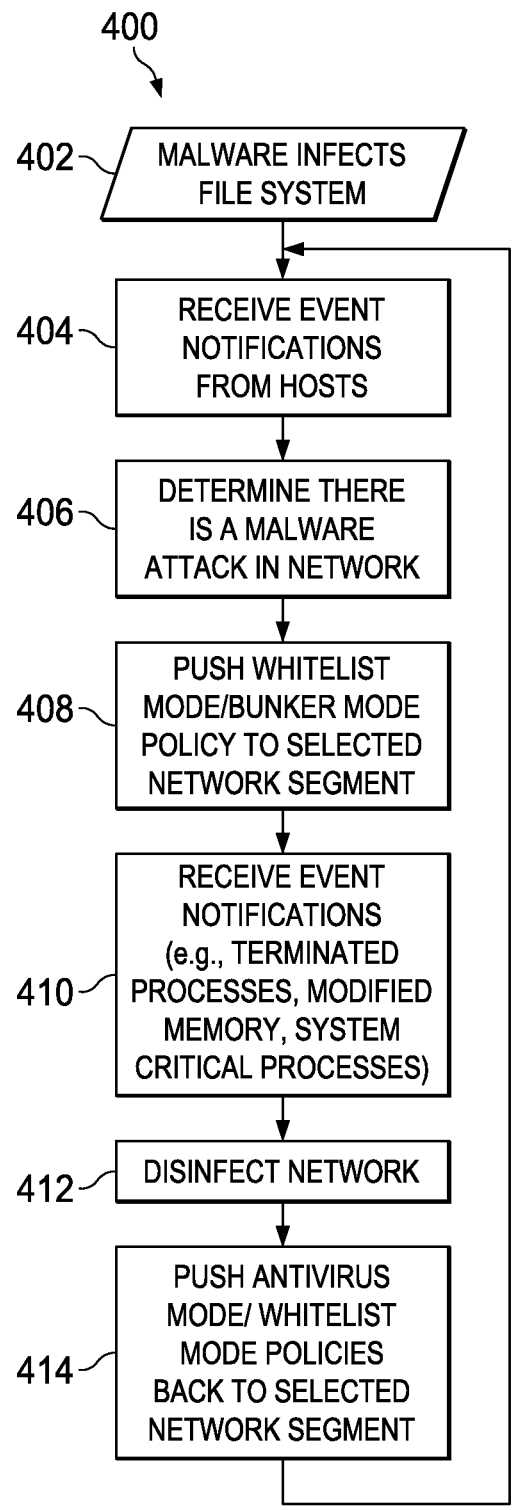
FIG. 4 is a simplified flow chart illustrating additional example operations that may be associated with the system in accordance with this disclosure.
Figure 5:
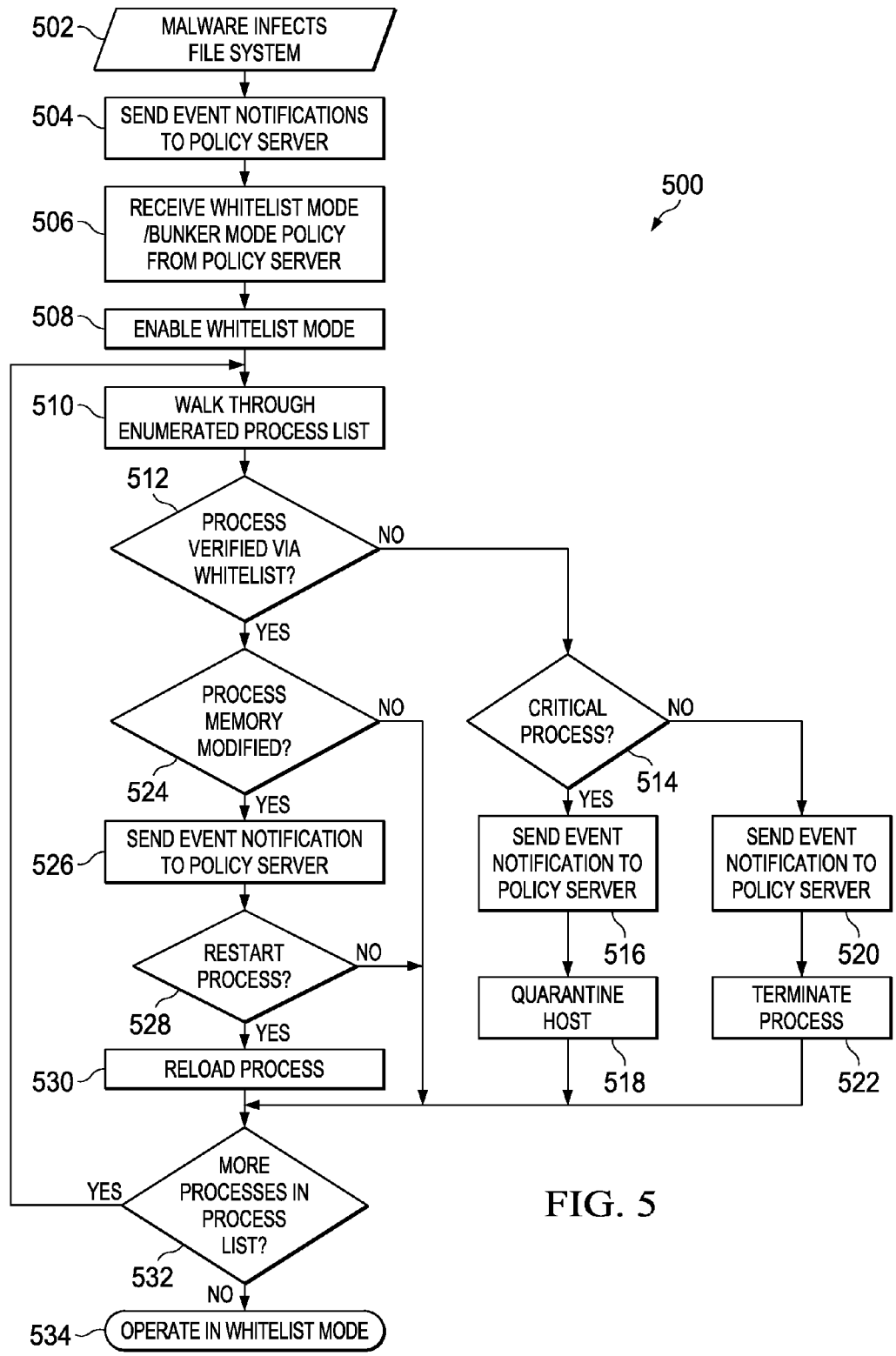
FIG. 5 is a simplified flowchart illustrating further potential operations that may be associated with the system in accordance with the present disclosure.

FIGS. 3-5 are flow charts of example operations that may be associated with the system for transitioning to a whitelist mode during a malware attack. FIG. 3 illustrates a flow 300 of operations that may be performed when a host 60 boots up in a clean or malware-free network (e.g., network 20 prior to malware 18 attacking endpoint device 40b and web server 48).

When host 60 boots up and network 20 is in a clean or malware-free state, a normal mode can be enabled, which can include both an antivirus mode and a whitelist observation mode. Antivirus agent 67 waits for requests to execute new software objects at 304. When a request is made to execute a software object, then the software object can be evaluated at 306 to determine whether it contains malware. In example embodiments, antivirus agent 67 can determine whether the software object is represented on a blacklist, such as local blacklist 42, before it is loaded for execution. If the software object is represented on blacklist 42 (e.g., in the form of a checksum), then antivirus agent 67 can block execution of the software object at 310 and send an event notification at 312 to policy server 50. However, if the software object is not represented on blacklist 42, then it can be permitted to execute at 308, thereby creating a new process on host 60. This new process corresponds to the software object and is considered an invocation of the software object.

While the antivirus mode is enabled to prevent blacklisted software objects from executing on host 60, whitelist agent 68 may operate in the observation mode to create and maintain process list 69 for host 60. Process list 69 can include enumerated identifications that uniquely identify currently executing processes on host 60. By way of example, certain implementations may rely on process identifiers (process IDs or PIDs) to uniquely identify each process in process list 69. Moreover, other information may also be contained in process list 69, such as parent process information, process name, details of the user who launched the process, etc. Such processes can correspond to (i.e., be invocations of) applications, dynamic link library (DLL) files, kernel drivers, and any other executing software objects. If whitelist agent 68 detects a new process on host 60 at 314, then at 316, a corresponding process ID can be added to process list 69. If the new process creates sub-processes by loading other software objects (e.g., dynamic link library (DLL) files, kernel drivers, etc.) as determined at 318, then at 320 process IDs corresponding to the sub-processes can be added to process list 69. Additionally, any time a process ends, process list 69 can be updated to remove the process IDs corresponding to the ending process and any associated sub-processes.

Whitelist agent 68 may also keep track of modifications to memory where a process is loaded ('process memory'). Thus, a determination is made at 322 as to whether process memory has been modified. If process memory has been modified, then such modifications could indicate that the executing process is being manipulated by malware. Therefore, these modifications can be logged at 324. If no process memory modifications have been made, however, then whitelist agent 68 can continue monitoring new processes at 314.

FIG. 4 depicts a flow 400 of operations that may be performed by policy server 50 in embodiments of the system for transitioning to a whitelist mode during a malware attack. At 402, malware infects a file system of a host (e.g., malware 18 infecting endpoint device 40b and web server 48 in network 20). Policy server 50 may start receiving event notifications from infected hosts at 404. These event notifications may simply be notifications of increased network activity, certain ports being used, certain times of day network activity increases for particular hosts, etc. Such notifications may not conclusively establish a malware attack, but can be correlated with other data (e.g., other event notifications from the same or other hosts) to provide informational data to a network administrator who may notice something unusual.

At 406, a determination may be made that there is a malware attack in the network. This determination can be made by the network administrator in light of reports provided by policy server 50 and possible further investigation of suspicious activity. In some embodiments, policy server 50 can be configured with an option to enable the network administrator to select some criteria that, if satisfied, justifies an assumption that the network has been attacked by malware.

Once a determination has been made (or preselected criteria has been satisfied), an attack signal (e.g., a whitelist mode policy) can be sent to a selected network segment at 408. The selected network segment could be the entire network or a selected one or more segments of the network (e.g., all hosts in a production system of company's network). The attack signal can be manually triggered by, for example, the network administrator via management console 51. Alternatively, if particular criteria selected by the network administrator in policy server 50 are satisfied, then the attack signal could be automatically generated by policy server 50.

After attack signal 70 has been sent to the selected network segment at 408, and hosts in the selected network segment transition from an antivirus mode to a whitelist mode, policy server 50 may receive event notifications from the hosts at 410. These notifications may be inclusive of activities resulting from the transition to the whitelist mode. For example, notifications regarding terminated processes (e.g., processes associated with software objects not represented on the whitelist), modified process memory (e.g., modifications to process memory that occurred during the antivirus mode), and corrupted critical processes that are identified as a process list for the respective host is evaluated.

At 412, the network can be disinfected while the selected network segment operates in the whitelist mode. Malware can be removed from the network in addition to other remedial actions. For example, local and/or global blacklists (e.g., blacklists 42 and 12, respectively) may be updated to include the new virus signature. In addition, vulnerable software objects may also be patched. After remedial action has been taken, policy server 50 can send an all-clear signal back to hosts in the selected network segment at 414. In potential embodiments of the system, the all-clear signal can be in the form of an antivirus mode policy and/or a whitelist mode policy to transition back to the antivirus mode from the whitelist mode. Thus, each host in the selected network segment can resume the antivirus (or normal) mode of operation and can disable the whitelist mode. Additionally, whitelist agent 68 can resume the observation mode.

Turning to FIG. 5, FIG. 5 depicts a flow 500 of operations that may be performed by protection module 64 in host 60 in embodiments of the system. Antivirus agent 67 may protect host 60 until transition control agent 65 is triggered. After malware infects a file system in host 60, host 60 may send event notifications to policy server 50 at 504, if any notification-worthy events occur on host 60. Transition control agent 65 may be triggered at 506 when attack signal 70 is sent to host 60 from policy server 50. In example embodiments, attack signal 70 may be in the form of a whitelist policy pushed to host 60 from policy server 50 via policy updates 72. Transition control agent 65 can transition host 60 from operating in an antivirus mode to operating in a whitelist mode. This transition can be accomplished by enabling the whitelist mode at 508 (e.g., by switching whitelist agent 68 from the observation mode to the whitelist mode) and by disabling the antivirus mode (e.g., by switching antivirus agent 67 from the antivirus mode to a dormant mode). In some embodiments, the antivirus mode may not be disabled until process list 69 has been evaluated for corrupt processes and/or the whitelist mode has been enabled.

At 510, transition control agent 65 can evaluate each process enumerated in process list 69 to determine whether any processes are associated with a software object that is not whitelisted. If a software object corresponding to a process on process list 69 is not represented on whitelist 44, as determined at 512, and the corresponding process is not a critical process as determined at 514, then an event notification can be sent to policy server 50 at 520 and the corresponding process can be terminated at 522. If the corresponding process is a sub-process of an associated process that loaded it, then the sub-process, the associated process that loaded it, and all other loaded sub-processes can be terminated. If, however, the software object is not represented on whitelist 44, as determined at 512, but the corresponding process is a critical process as determined at 514, then an event notification can be sent to policy server 50 at 516 and host 60 may be quarantined at 518.

If the software object is represented on whitelist 44, as determined at 512, then further evaluation may be performed to determine whether modifications were made to process memory (i.e., memory where the process is loaded) when host 60 was operating in the antivirus mode. If modifications were made to process memory, then an event notification can be sent to policy server 50 at 526. A determination may then be made at 528 as to whether to restart the process. Restarting the process when host 60 is in the whitelist mode can prevent the new process from incurring process memory modifications because whitelist agent 68 can have memory protection enabled, thereby preventing such memory modifications. If it is determined that the process should be restarted, then it may be reloaded at 530.

After a process from process list 69 has been evaluated and appropriate action has been taken (e.g., process allowed to continue, process terminated, process reloaded, or host quarantined), then a determination may be made at 532 as to whether more processes are enumerated in process list 69. If more processes are enumerated, then flow begins again at 510 where another process is evaluated with reference to whitelist 44. If no more processes are enumerated in process list 69, however, then host 60 can continue to operate in the whitelist mode until transition control agent 65 receives an all-clear signal indicating the normal mode (or antivirus mode) should be resumed (e.g., if the malware attack has been remedied). The all-clear signal could be in the form of an antivirus policy and/or whitelist policy from policy server 50.

In an alternative embodiment, the antivirus mode can remain enabled when the host is operating in the whitelist mode, if controlling mechanisms are provided to prevent conflicts between the antivirus mode and the whitelist mode. For example, a request to execute a new software object could be passed to antivirus agent 67. If the software object is blacklisted, then execution could be blocked. However, if the software object is not blacklisted, then control could be passed to whitelist agent 68, to determine whether the software object is whitelisted. If the software object is whitelisted, then it could be permitted to execute. Otherwise, execution could be blocked.

The system for transitioning to a whitelist mode during a malware attack may provide significant advantages for a network in which it is implemented. For example, the network could have virtually no downtime during a general or targeted malware attack. Accordingly, critical processes running in the network can continue processing as long as the process itself is not infected. Therefore, businesses can keep their business functioning and performing legitimate business activities while recovery and clean up efforts are underway.

Note that with the example provided above, as well as numerous other examples provided herein, interaction may be described in terms of two, three, or four components (e.g., network elements, endpoint devices, databases and other memory elements, hosts). However, this has been done for purposes of clarity and example only. In certain cases, it may be easier to describe one or more of the functionalities of a given set of flows by only referencing a limited number of such components. It should be appreciated that the system of network environment 5 (and its teachings) are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the steps in the preceding flow diagrams illustrate only some of the possible scenarios and patterns that may be executed by, or within, the system of network environment 5. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the system in that any suitable arrangements, chronologies, configurations, and timing mechanisms may be provided without departing from the teachings of the present disclosure.

Additionally, although the system for transitioning to a whitelist mode during a malware attack, as outlined by FIG. 1, has been illustrated with reference to particular elements and operations that facilitate the communication process, these elements and operations may be replaced by any suitable architecture or process that achieves the intended functionality of the system. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
    receiving at least one signal to enable a whitelist mode and disable an antivirus mode on a host in a network;
    enabling the whitelist mode on the host and disabling the antivirus mode on the host, wherein the whitelist mode includes:
        preventing execution of a software object on the host responsive to determining the software object is not represented on a whitelist; and
        allowing another software object to be executed responsive to determining the other software object is represented on the whitelist;
    identifying a first process of a plurality of processes on a process list of the host, the first process associated with one or more first software objects, wherein each one of the plurality of processes was invoked prior to the whitelist mode being enabled and the antivirus mode being disabled;
    allowing the first process to continue running unimpeded on the host after the whitelist mode is enabled on the host, wherein the first process is allowed to continue running responsive to determining each of the one or more first software objects is represented on the whitelist and process memory associated with the first process has not been modified;
    identifying a second process on the process list of the host, the second process associated with one or more second software objects;
    terminating the second process on the host after the whitelist mode is enabled on the host, wherein the second process is terminated responsive to determining any of the one or more second software objects is not represented on the whitelist and the one or more second software objects are not part of a critical process;
    identifying a third process on the process list of the host, the third process associated with one or more third software objects;
    restarting the third process on the host after the whitelist mode is enabled on the host, wherein the third process is restarted responsive to determining each of the one or more third software objects is represented on the whitelist and process memory associated with the third process was modified before the whitelist mode was enabled,
    identifying a fourth process on the process list of the host, the fourth process associated with one or more fourth software objects;
    wherein the host is quarantined if any of the one or more fourth software objects is not represented on the whitelist and any of the one or more fourth software objects is part of a critical process.

2. The method of claim 1, wherein the antivirus mode is disabled on the host after the whitelist mode is enabled on the host.

3. The method of claim 1, further comprising:
    receiving a second signal to enable the antivirus mode after enabling the whitelist mode; and
    disabling the whitelist mode.

4. The method of claim 1, wherein the whitelist is dynamically updated.

5. The method of claim 1, wherein at least one of the one or more first software objects corresponds to a sub-process of the first process.

6. An apparatus, comprising:
    a protection module;
    a memory element configured to store software objects;
    one or more processors operable to execute instructions, associated with the software objects and the protection module, comprising:
        receiving at least one signal to enable a whitelist mode and disable an antivirus mode on a host in a network;
        enabling the whitelist mode on the host and disabling the antivirus mode on the host, wherein the whitelist mode includes:
            preventing execution of a software object on the host responsive to determining the software object is not represented on a whitelist; and
            allowing another software object to be executed responsive to determining the other software object is represented on the whitelist;
        identifying a first process of a plurality of processes on a process list of the host, the first process associated with one or more first software objects, wherein each one of the plurality of processes was invoked prior to the whitelist mode being enabled and the antivirus mode being disabled;
        allowing the first process to continue running unimpeded on the host after the whitelist mode is enabled on the host, wherein the first process is allowed to continue running responsive to determining each of the one or more first software objects is represented on the whitelist and process memory associated with the first process has not been modified;
        identifying a second process on the process list of the host, the second process associated with one or more second software objects;
        terminating the second process on the host after the whitelist mode is enabled on the host, wherein the second process is terminated responsive to determining any of the one or more second software objects is not represented on the whitelist and the one or more second software objects are not part of a critical process;
        identifying a third process on the process list of the host, the third process associated with one or more third software objects;
        restarting the third process on the host after the whitelist mode is enabled on the host, wherein the third process is restarted responsive to determining each of the one or more third software objects is represented on the whitelist and process memory associated with the third process was modified before the whitelist mode was enabled,
        identifying a fourth process on the process list of the host, the fourth process associated with one or more fourth software objects;

wherein the host is quarantined if any of the one or more fourth software objects is not represented on the whitelist and any of the one or more fourth software objects is part of a critical process.

7. The apparatus of claim 6, wherein the antivirus mode is disabled on the host after the whitelist mode is enabled on the host.

8. The apparatus of claim 6, wherein the one or more processors are operable to perform further operations comprising:
receiving a second signal to enable the antivirus mode after enabling the whitelist mode; and
disabling the whitelist mode.

9. The apparatus of claim 6, wherein the whitelist is dynamically updated.

10. The apparatus of claim 6, wherein at least one of the one or more second software objects corresponds to a sub-process of the second process.

11. Logic encoded in non-transitory media that includes code for execution and when executed by one or more processors is operable to perform operations comprising:
receiving at least one signal to enable a whitelist mode and disable an antivirus mode on a host in a network;
enabling the whitelist mode on the host and disabling the antivirus mode on the host, wherein the whitelist mode includes:
preventing execution of a software object on the host responsive to determining the software object is not represented on a whitelist; and
allowing another software object to be executed responsive to determining the other software object is represented on the whitelist;
identifying a first process of a plurality of processes on a process list of the host, the first process associated with one or more first software objects, wherein each one of the plurality of processes was invoked prior to the whitelist mode being enabled and the antivirus mode being disabled;
allowing the first process to continue running unimpeded on the host after the whitelist mode is enabled on the host, wherein the first process is allowed to continue running responsive to determining each of the one or more first software objects is represented on the whitelist and process memory associated with the first process has not been modified;
identifying a second process on the process list of the host, the second process associated with one or more second software objects;
terminating the second process on the host after the whitelist mode is enabled on the host, wherein the second process is terminated responsive to determining any of the one or more second software objects is not represented on the whitelist and the one or more second software objects are not part of a critical process;
identifying a third process on the process list of the host, the third process associated with one or more third software objects;
restarting the third process on the host after the whitelist mode is enabled on the host, wherein the third process is restarted responsive to determining each of the one or more third software objects is represented on the whitelist and process memory associated with the third process was modified before the whitelist mode was enabled,
identifying a fourth process on the process list of the host, the fourth process associated with one or more fourth software objects;
wherein the host is quarantined if any of the one or more fourth software objects is not represented on the whitelist and any of the one or more fourth software objects is part of a critical process.

12. The logic of claim 11, wherein the antivirus mode is disabled on the host after the whitelist mode is enabled on the host.

13. The logic of claim 11, wherein the one or more processors are operable to perform further operations comprising:
receiving a second signal to enable the antivirus mode after enabling the whitelist mode; and
disabling the whitelist mode.

14. The logic of claim 11, wherein the whitelist is dynamically updated.

15. The logic of claim 11, wherein at least one of the one or more third software objects corresponds to a sub-process of the third process.

* * * * *